US008451483B2

(12) United States Patent
Yamada et al.

(10) Patent No.: US 8,451,483 B2
(45) Date of Patent: May 28, 2013

(54) INFORMATION PROCESSING APPARATUS PRESENTING RECOMMENDED OPTIONAL FUNCTION TO IMAGE FORMING APPARATUS, AND IMAGE FORMING SYSTEM

(75) Inventors: Masanori Yamada, Osaka (JP); Mikiya Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 396 days.

(21) Appl. No.: 12/807,202

(22) Filed: Aug. 31, 2010

(65) Prior Publication Data

US 2011/0051165 A1   Mar. 3, 2011

(30) Foreign Application Priority Data

Sep. 3, 2009 (JP) ................................. 2009-203674

(51) Int. Cl.
*G06F 3/12* (2006.01)
*G06K 15/00* (2006.01)

(52) U.S. Cl.
USPC .......... 358/1.15; 358/1.16; 717/106; 717/173

(58) Field of Classification Search
None
See application file for complete search history.

(56) References Cited

U.S. PATENT DOCUMENTS

2006/0031816 A1*  2/2006 Umeda ......................... 717/106
2008/0098389 A1   4/2008 Akiyoshi et al.
2008/0263540 A1* 10/2008 Bando et al. .................. 717/173

FOREIGN PATENT DOCUMENTS

| JP | 2003-241928 A | 8/2003 |
| JP | 2004-054739 A | 2/2004 |
| JP | 2007-166057 A | 6/2007 |
| JP | 2007-301788 A | 11/2007 |
| JP | 2009-064420 A | 3/2009 |

* cited by examiner

*Primary Examiner* — Marivelisse Santiago Cordero
*Assistant Examiner* — Huo Long Chen
(74) *Attorney, Agent, or Firm* — Edwards Wildman Palmer LLP; David G. Conlin; David A. Tucker

(57) ABSTRACT

In an MFP having various and many functions and part of the functions introduced as optional functions, in order to appropriately introduce an optional function related to a frequently used function, a CPU of the MFP executes a program including the steps of; receiving and storing information of an optional function recommended for a standard function used frequently, from an FSS server computer (S3110); when a function is selected by a logged-in user (YES at S3020), determining whether or not any recommended optional function is stored (S3030); when a recommended optional function is stored (YES at S3030), displaying an image recommending the optional function related to the function selected by the user (S3050); and transmitting, as a job completing process, selected functions to the FSS server computer (S3080).

8 Claims, 11 Drawing Sheets

FIG. 4

| MACHINE ID | SEGMENT | INTRODUCED OPTION (1) | INTRODUCED OPTION (2) | INTRODUCED OPTION (3) | INTRODUCED OPTION (4) | ... |
|---|---|---|---|---|---|---|
| M001 | A | | | | | |
| M002 | B | | | | | |
| M003 | B | | | | | |
| M004 | B | | | | | |
| M005 | A | | | | | |
| ... | | | | | | |

FIG. 5

| USER ID | MACHINE ID | DATE & TIME OF USE | BASIC FUNCTION (MODE) | SET FUNCTION (1) | SET FUNCTION (2) | SET FUNCTION (3) | ... |
|---|---|---|---|---|---|---|---|
| 000001 | M001 | 2009/8/6 18:06:15 | COPY | 2in1/4in1 | DUPLEX COPY | – | – |
| 000005 | M002 | 2009/8/7 09:15:45 | COPY | 2in1/4in1 | TRIAL COPY | – | – |
| ... | ... | ... | FAX/IMAGE TRANSMISSION | ... | ... | | |
| ... | ... | ... | DOCUMENT FILING | ... | ... | | |

FIG. 6

| MACHINE ID | USED FUNCTION | FREQUENCY OF USE (PER MONTH) | RECOMMENDED OPTION | MANNER OF IMPLEMENTATION | ... |
|---|---|---|---|---|---|
| M001 | COPY/BULK PRINT | ... | LARGE CAPACITY PAPER FEED TRAY | HARDWARE | |
| | COPY/FILING/BULK | ... | SCANNER HIGH COMPRESSION UNIT | HARDWARE & SOFTWARE | |
| | COPY/FILING/BULK | ... | SCANNER HIGH COMPRESSION UNIT | SOFTWARE | |
| M002 | DOCUMENT FILING/FOLDER DESIGNATION | ... | FOLDER TEMPLATE | SOFTWARE | |
| ... | | | | ... | |
| | | | | | |
| | | | | | |

FIG. 10

| SEGMENT | MACHINE ID | USED FUNCTION | FREQUENCY OF USE (PER MONTH) | RECOMMENDED OPTION | MANNER OF IMPLEMENTATION | ... |
|---|---|---|---|---|---|---|
| SEGMENT A | M001 | COPY/BULK PRINT | | LARGE CAPACITY PAPER FEED TRAY | HARDWARE | |
| | | COPY/FILING/BULK | | SCANNER HIGH COMPRESSION UNIT | HARDWARE & SOFTWARE | |
| | | COPY/FILING/BULK | | SCANNER HIGH COMPRESSION UNIT | SOFTWARE | |
| | M005 | | | | | |
| | M011 | | | | | |
| | ... | | | | | |
| SEGMENT B | M002 | DOCUMENT FILING/FOLDER DESIGNATION | | FOLDER TEMPLATE | SOFTWARE | |
| | M003 | | | | | |
| | M004 | | | | | |
| | ... | | | | | |
| ... | | | | | | |

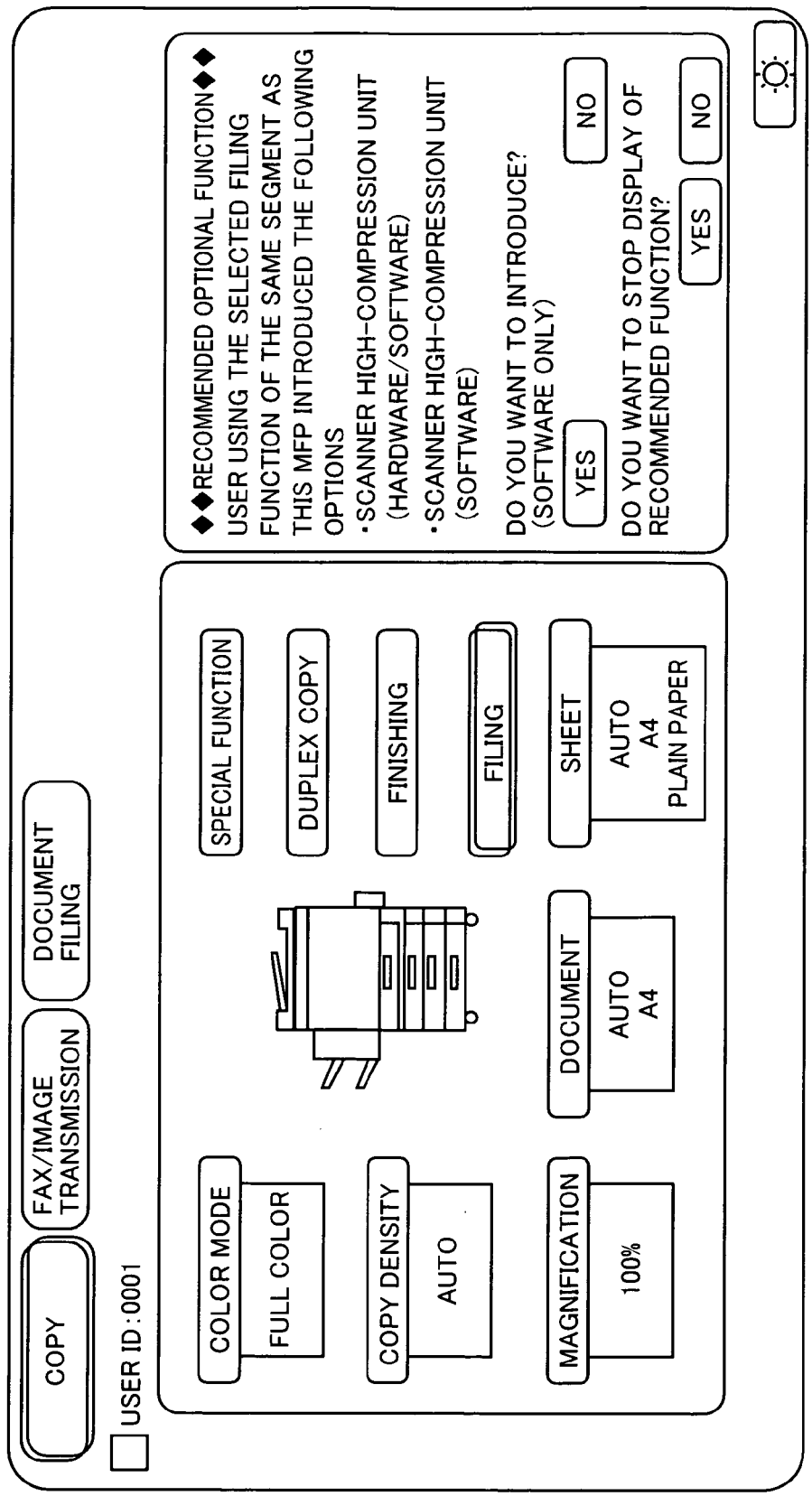

INFORMATION PROCESSING APPARATUS PRESENTING RECOMMENDED OPTIONAL FUNCTION TO IMAGE FORMING APPARATUS, AND IMAGE FORMING SYSTEM

CROSS-REFERENCE TO RELATED APPLICATION

This nonprovisional application claims priority under 35 U.S.C. §119(a) on Patent Application No. 2009-203674 filed in Japan on Sep. 3, 2009, the entire contents of which are hereby incorporated by reference.

BACKGROUND OF THE INVENTION

1. Field of the Invention

The present invention relates to a technique of executing, in an image forming apparatus having optional functions prepared therefor, a function selected by a user from a large number of functions and, more specifically, to a technique of informing the user of a not-yet-introduced optional function related to a selected function.

2. Description of the Background Art

It has become increasingly common to connect an image forming apparatus having a printer function or a copy function to a network, to allow use by a plurality of users. Further, the number of apparatuses having a plurality of basic functions (also referred to as modes) such as a copy function, a facsimile function (hereinafter "facsimile" may also be denoted as FAX or fax), a network-supported printer function and a scanner function, such as multi-function peripherals (MFP) is increasing. In such a multi-function peripheral, each user selects a basic function (mode) and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner.

When a user uses such an MFP, the user inputs image data using, for example, the scanner function, performs image processing (such as collection) by inputting various instructions through an operation panel, and prints the results using the printer function. Such an MFP has many functions. In addition, optional functions to be introduced in accordance with a request by the user are prepared. Functions that are provided as standards, as opposed to the optional functions, are sometimes referred to as standard functions.

By way of example, such optional functions include: a duplex printing unit of forming image data on both sides of a sheet of recording paper; a large capacity paper feed tray enabling feeding of a large amount of recording paper; and a scanner high-compression unit of highly compressing image data read by the scanner function to reduce volume of data. The large capacity paper feed tray is provided as hardware, the duplex printing unit is provided as hardware and software, and the scanner high-compression unit may be provided as software or provided as software and hardware.

Software corresponding to the copy function, facsimile function, printer function and scanner function is introduced to an MFP. Further, after shipment of an MFP, a new application developed by the manufacturer of the MFP or a third vendor to the MFP can be introduced. Such an application or applications correspond to the optional functions implemented by software.

Therefore, MFPs of different types and even MFPs of the same type come to have different optional functions introduced thereto. As a result, a situation occurs in which a specific function can be executed by one MFP but cannot be executed by another MFP.

Japanese Patent Laying-Open No. 2007-301788 (hereinafter referred to as "'788 Reference") discloses an electronic instrument system (image forming system), in which some functions to be executed by an image forming apparatus or the like are executed by an external device as a substitute connected through a network, whereby necessary and sufficient functions for the image forming apparatus can be attained and limited resources can be utilized effectively.

The system includes an electronic instrument (image forming apparatus) executing one or more prescribed functions by an application or applications, and a function providing device connected through a network to the electronic instrument. The electronic instrument has a function substituting section that transmits, if a function, not having a firmware component for execution thereof installed, is called by an application, function information necessary to execute the function to the external function providing device connected by the network, and receives the result of execution of the function; and the function providing device selects, based on the function information from the electronic instrument, a firmware component to be called, executes the function, and transmits the result of execution to the function substituting section of the electronic instrument.

In the system, if a function having a firmware component for execution installed is called by the application, the electronic instrument executes the function using the installed firmware component. On the other hand, if a function, a firmware component for execution of which is not installed, is called by the application, the electronic instrument transmits, using the function substituting section, the function information necessary for executing the function, to the function providing device through the network. Consequently, the function providing device executes the function based on the function information, and transmits the result of execution to the function substituting section through the network. In response, the electronic instrument outputs the result of execution of the function received by the function substituting section. Therefore, seemingly, the electronic instrument can execute all functions called by the application, while it is unnecessary to install all firmware components to execute all functions. For instance, for a function not frequently used, it is unnecessary to install a firmware component required to execute the function. Thus, occupation of system resources in the electronic component can be reduced, and hence, the problem of shortage of system resources can be solved.

Japanese Patent Laying-Open No. 2009-64420 (hereinafter referred to as "'420 Reference") discloses an image forming apparatus in which application information as to whether an application introduced to an MFP can be installed or not is displayed on an operation panel.

The image forming apparatus includes an operation panel for displaying or inputting operation information. The image forming apparatus includes: an information acquisition unit for acquiring application information related to an application used in the image forming apparatus; a determining unit determining, based on the application information acquired by the information acquisition unit, whether or not the application can be installed in the image forming apparatus; and a display unit for displaying the application information acquired by the information acquisition unit or information related to the application information, on the operation panel.

In the image forming apparatus, information is displayed on the operation panel based on the application information. Therefore, the user can appropriately select an application to be installed or appropriately determine whether or not install is possible. Further, whether install is possible or not can be determined by the image forming apparatus, and only the installable applications are displayed. Therefore, the user can select only the installable applications.

Recent multifunction peripherals have a large number of functions to meet various and many demands of the users. As described above, some of the functions are prepared as optional functions, and may not be introduced to the MFP at the time of shipment. In such a case, even if an optional function that is related to a function often selected by the user and makes the selected function more convenient is prepared, it may be difficult for the user to come to know the function. For instance, though a catalog listing optional functions for an MFP is available, it is difficult for some user to know simply by looking through the catalog, which optional function should be introduced to make more convenient a function he/she often uses. If the number of optional functions increases, it becomes more difficult to find an optional function that makes more convenient the function the user often uses.

In this connection, in the image forming apparatus disclosed in '788 Reference, even an optional function not provided in the image forming apparatus used by the user can be executed by another image forming apparatus through the network, if the said another image forming apparatus connected to the network has the optional function. If the user does not know the optional function, there is no way to have the function executed by a substitute device. Particularly, even if there is an optional function related to a function often used by the user, execution by the substitute is impossible unless the user comes to know about the optional function. Thus, it follows that the user continues image forming process without using the optional function.

The image forming apparatus disclosed in '420 Reference merely determines whether or not an application not provided in the image forming apparatus used by the user can be introduced to the image forming apparatus. If the user does not know the optional function (realized by an application), introduction thereof is out of question. In the first place, the image forming apparatus according to '420 Reference can attain its effect only when the user is fully aware of the application which he/she wishes to introduce.

With the recent development of networks (the Internet), a so-called FSS (Field Support System) comes to be adopted in companies and offices, in which knowledge of technical or product specification information, customer information, and failure information are stored in a database system and utilized for supporting MFP users. Use of such a system is expected to improve business efficiency, to speed up responses to the clients, and to reduce cost. In an FSS for MFPs, a system allowing transmission of information related to states of multifunction peripherals to a customer center having the database system for customer and service management, or a system allowing changing setting of an MFP by remote control of the MFP from the customer center is established. In such a configuration, by accessing an MFP from, for example, a server in the customer center and changing settings of the MFP, trouble shooting is possible without dispatching service personnel.

When such a management server (FSS server described above) for remote-maintenance of image processing apparatuses is used, it is possible to know a function or functions used by many users, and to know an optional function or functions introduced to an MFP. It is often the case that image forming apparatuses belonging to the same segment (class (category) defined by the rate of output to standard recording paper such as A4-sized paper (image forming rate, output rate) have similar standard functions and have similar optional functions prepared therefor. In such a situation, when the management server described above is used, it is possible to know options that are introduced by many users and options that are not, among MFPs belonging to the same segment.

Though remote maintenance of image processing apparatuses as such has been known, consideration has not been made as to the relation between the collected information of MFPs and the optional functions.

SUMMARY OF THE INVENTION

The present invention was made to solve such a problem, and its object is to provide an information processing apparatus presenting, in an image forming apparatus having various and many functions and part of the functions introduced as optional functions, optional functions related to frequently used functions, thereby to appropriately introduce prepared optional functions and to allow the user to conveniently use the functions, and to provide an image forming apparatus communicable to the information processing apparatus as well as an image forming system including these apparatuses.

According to an aspect, the present invention provides an information processing apparatus for processing information of an optional function related to a function used in an image forming apparatus. The information processing apparatus includes: a receiving device receiving use history information related to a function of the image forming apparatus used by a user; a storage storing the received use history information; a collecting device collecting functions having high frequency of use based on the stored use history information; an extracting device extracting, from optional functions prepared for the image forming apparatus, an optional function related to a function having high frequency of use; and a transmitting device transmitting information related to the function of high frequency of use and related to the extracted optional function, to be presented to the user on the image forming apparatus, to the image forming apparatus.

In the information processing apparatus, based on the history information related to the use of functions selected by the user in the image forming apparatus, functions having high frequency of use are collected. Among the optional functions prepared for the image forming apparatus, optional functions related to functions of high frequency of use are extracted. Here, optional functions that realize more convenient use by the user when combined with the frequently used functions are extracted. Since the optional functions are presented on the image forming apparatus to the user, it is possible for the user to know the optional functions related to the functions used frequently by the user, without any specific operation on the image forming apparatus. If such an optional function or optional functions are introduced to the image forming apparatus, it becomes possible to use the function frequently used by the user more conveniently.

The information processing apparatus may be configured to further include an optional function storage storing an optional function introduced to the image forming apparatus. In that case, the transmitting device may include a transmitting unit for transmitting information related to the extracted optional function not introduced in the image forming apparatus.

An optional function related to the function often used by the user but not introduced to the image forming apparatus is presented to the user. By introducing the optional function to the image forming apparatus, it becomes possible to use the function frequently used by the user more conveniently.

The collecting device may be configured to include a collecting unit collecting functions having high frequency of use by the category distinguished based on output rate of the image forming apparatuses. In that case, the extracting device may include an extracting unit for extracting, by the category, an optional function related to a function having high frequency of use; and the transmitting apparatus may include a transmitting unit for transmitting information related to the function having high frequency of use and related to the extracted optional function, to an image forming apparatus belonging to the same category.

The functions having high frequency of use are collected by the category (substantially the same as the segment, and classified in accordance with the rate of output to standard recording paper such as A4-sized paper (output rate)) classified in accordance with the output rate of image forming apparatuses, and the optional functions related to the functions of high frequency of use are extracted by the category. Information related to the optional functions is transmitted to the image forming apparatuses belonging to the same category, including an image forming apparatus that does not transmit any information related to its use history. It is often the case that image forming apparatuses of the same category have similar functions (and similar optional functions are prepared). Therefore, even to a user who does not want to transmit the information of his/her use history in view of security concerns, optional functions related to a function or functions often used by the user can be presented.

The information processing apparatus may be implemented by a management server performing remote-maintenance of the image forming apparatus.

It is possible, by using an FSS server performing remote maintenance of image forming apparatuses, to collect pieces of information related to use history of the image forming apparatuses, and to present optional functions related to the function or functions often used by the user.

According to another aspect, the present invention provides an image forming apparatus, including: a transmitting device transmitting, if transmission is permitted, use history information to any of the above-described information processing apparatuses; and a receiving apparatus receiving information related to the optional function from the information processing apparatus.

From the information processing apparatus, information of the optional function related to the function often used by the user is transmitted, and when the information is presented to the user, the user can know the optional function related to the function he/she often uses. When such an optional function is introduced to the image forming apparatus, use of the function often used by the user becomes more convenient. If transmission of the use history information is permitted, the use history information is transmitted to the information processing apparatus and if it is not permitted, the use history information is not transmitted. Even in that case, it is possible to receive the information of optional function of the image forming apparatuses of the same category and to present it to the user.

The image forming apparatus may further include a selecting device allowing a user to select a function to be used; and a display device for presenting, when a function having high frequency of use is selected by the user, information of an optional function related to the selected function to the user.

In the image forming apparatus, when a function to be used is selected from a large number of functions, information of optional function related to the function is presented to the user. Therefore, it is possible for the user to know the optional function related to the function he/she often uses, simply by selecting the function to be used in the image forming apparatus.

The image forming apparatus may be configured to further include an input device used by the user to input whether information of the optional function is to be displayed or not. In that case, the display device may include a presenting unit presenting, if it is input by the user to display the information of the optional function, the information of the optional function to the user.

If the user does not request display of the information related to the optional function, the information related to the optional function is not presented to the user. The information related to the optional function can be presented only to the user who needs such information.

The image forming apparatus may further include a communication apparatus communicating with a processing apparatus realizing the optional function by software; and a result receiving device, when execution of an optional function is requested by the user, transmitting data to the processing device, and receiving result of operation executed by the software in the processing device, from the processing device. Further, the image forming apparatus may include a communication device communicating with an application providing apparatus providing software; and a software receiving apparatus, when execution of an optional function is requested by the user, receiving software for realizing the optional function from the application providing apparatus.

The optional function realized by software may be realized by receiving result of operation by software executed in a processing apparatus to which data has been transmitted (in a similar manner to the so-called cloud computing), or it may be realized by downloading and installing software.

According to a still further aspect, the present invention provides an image forming system including any of the above-described information processing apparatuses and any of the above-described image forming apparatuses.

In the image forming system, based on the use history information of functions selected by the user in the image forming apparatus, the information processing apparatus collects functions having high frequency of use, and extracts optional functions related to the functions having high frequency of use from optional functions prepared for the image forming apparatus. In the image forming apparatus, information related to the optional functions is presented to the user. Therefore, optional functions related to the function often used by the user can easily be known. If such an optional function or functions are introduced to the image forming apparatus, it becomes possible to use the function frequently used by the user more conveniently.

By the information processing apparatus, image forming apparatus and the image forming system in accordance with the present invention, in an image forming apparatus having various and many functions and some of the functions introduced as optional functions, optional functions related to a frequently used function or functions are appropriately displayed and hence, prepared optional function or functions can be appropriately introduced, whereby it becomes possible for the user to conveniently use the functions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a machine management table stored in the server computer shown in FIG. 1.

FIG. 5 shows a user use history management table stored in the server computer shown in FIG. 1.

FIG. 6 shows a user use history analysis table stored in the server computer shown in FIG. 1.

FIG. 10 shows a user use history analysis table of segment-by-segment basis, stored in the server computer in accordance with a second embodiment of the present invention.

FIG. 12 is a transition diagram showing an exemplary display on a touch panel display when the program of FIG. 11 is executed.

DESCRIPTION OF THE PREFERRED EMBODIMENTS

Figure 1:
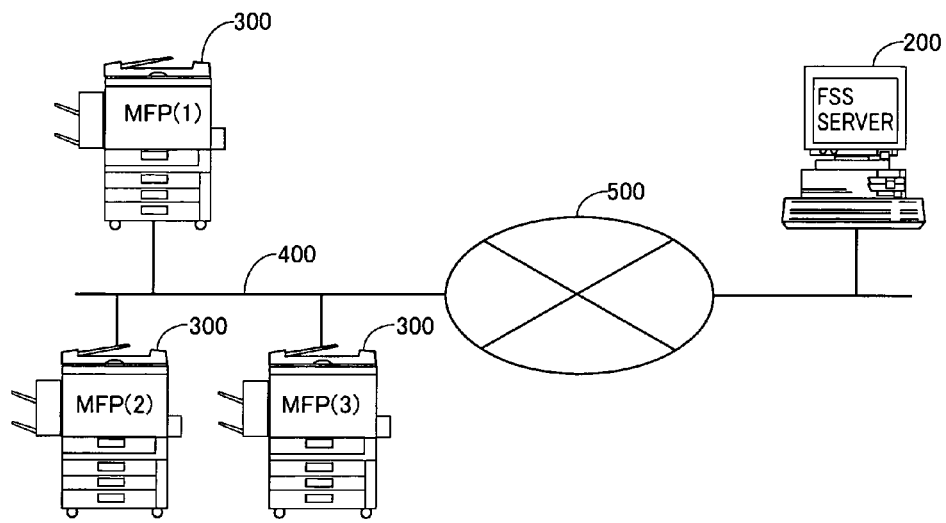
FIG. 1 shows an overall configuration of a network image forming system including an information processing apparatus (server computer) and an image forming apparatus (MFP), in accordance with a first embodiment of the present invention.

Embodiments of the present invention will be described. In the following description, the same components are denoted by the same reference characters. Their functions and names are also the same. Therefore, detailed description thereof will not be repeated. In the following description, it is assumed that the image forming apparatus in accordance with the present invention is an MFP. The present invention, however, is applicable to any image forming apparatus having at least some of the various and many functions prepared as optional functions, and not limited to the MFP.

In the following, the information processing apparatus processing information to analyze used functions and to present optional functions related to a function of high frequency of use to the user in accordance with the present invention will be described as a server computer (hereinafter also described as an FSS server computer). The apparatus, however, may not be a server computer other than the FSS server computer. Though a network image forming system including a plurality of MFPs is described in the first embodiment, the network image forming system may be formed by only one MFP communicating with the information processing apparatus described above. In the second embodiment, the network image forming system must be formed including at least two MFPs belonging to the same segment (category classified mainly by the output rate). Here, the segment refers to a hierarchy (or class) of the image output capability (image forming capability) of MFP. To determine the image output capability, the rate of outputting (output rate) to standard recording paper such as the A4-sized paper or a letter size paper (both in the lateral output with the shorter side aligned with the paper feed direction) may be used. The index for classifying MFPs to a plurality of classes based on functional capabilities of MFPs is not limited to the output rate. Further, the terms category and segment are not limited to such definitions.

—First Embodiment—

[Overall System Configuration]

Referring to FIG. 1, an overall configuration of a network image forming system in accordance with the first embodiment of the present invention will be described. The network image forming system includes: MFP (1) 300 to MFP (3) 300 (hereinafter MFP (1) 300 to MFP (3) 300 may be referred to as MFP 300), receiving a copy request or print request and printing an image on a sheet of recording paper, receiving a transmission request and transmitting image data, and receiving a scan request and storing image data obtained by scanning in a storage (internal hard disk); and an FSS server computer 200 processing user use histories of the plurality of MFPs 300. FSS server computer 200 and MFPs 300 are connected to be communicable to each other through a network line (LAN) 400 and the Internet 500. Though MFP (1) 300 to MFP (3) 300 are denoted by the same reference characters, they are not necessarily MFPs having the same functions. Further, the Internet 500 may be replaced by an intranet.

In the present embodiment, FSS server computer 200 stores the user use histories of MFPs 300 received through network line 400 and the Internet 500 in a user use history management table, together with a user ID for uniquely identifying the user and a machine ID for uniquely identifying each MFP 300. Based on the user use history, FSS server computer 200 calculates the frequency of use of each function in MFP 300, extracts an optional function recommendable for and related to the function of high frequency of use, and stores the extracted optional function in the user use history analysis table. FSS server computer 200 transmits recommended optional function information to MFP 300 through network line 400 and the Internet 500. Based on the recommended optional function information received from FSS server computer 200, MFP 300 displays the optional function related to a function requested by a logged-in user as recommended optional function, on a touch-panel display.

As described above, in the present embodiment, an optional function related to a function often used by the user of MFP 300 is displayed on the touch-panel display. Here, the optional function related to a function often used by the user represents a function that makes the function often used by the user more convenient, if the optional function is introduced to MFP 300.

In the following, in the drawings and the like, FSS server computer 200 may sometimes be simply denoted as server, and MFP 300 may be simply denoted as MFP.

[Hardware Configuration]

<FSS Server Computer 200>

Figure 2:
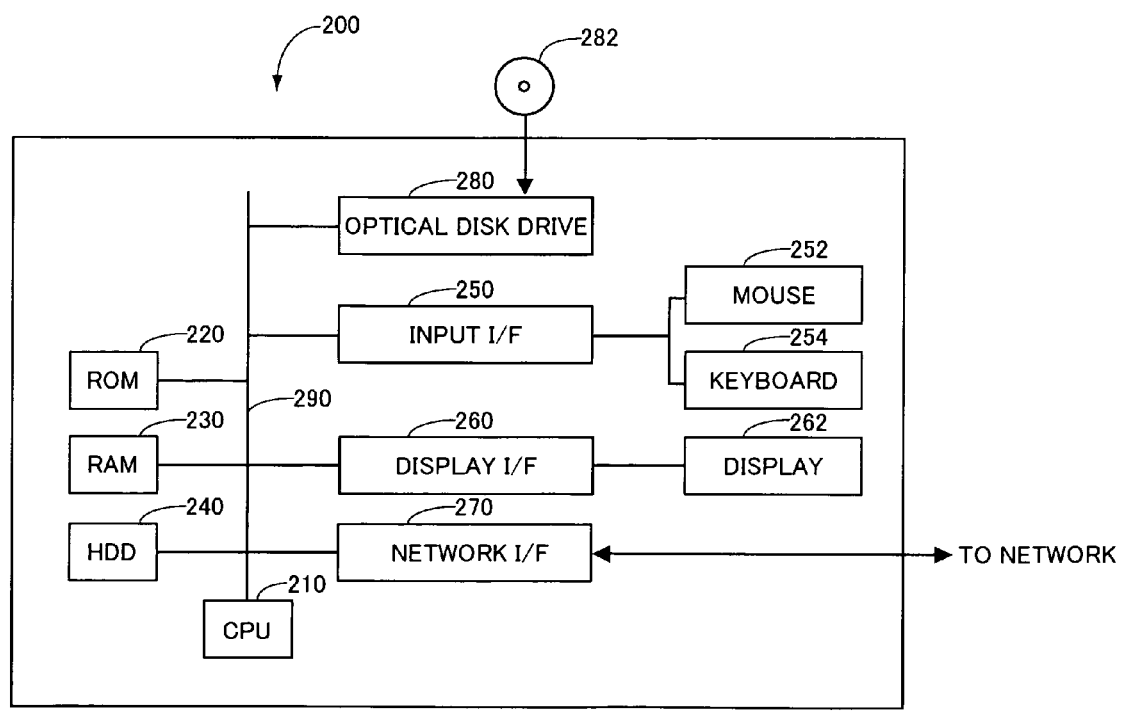
FIG. 2 is a control block diagram showing hardware configuration of the server computer shown in FIG. 1.

Referring to FIG. 2, FSS server computer 200 forming the network image forming system in accordance with the present embodiment includes: a bus 290; a CPU (Central Processing Unit) 210 connected to bus 290; an ROM (Read Only Memory) 220 connected to bus 290; an RAM (Random Access Memory) 230 connected to bus 290; a hard disk (HDD) 240 connected to bus 290; an optical disk drive 280, connected to bus 290, on which an optical disk 282 is mountable, and capable of writing of information to optical disk 282 and reading of information from optical disk 282; an input interface (hereinafter referred to as "input I/F") 250, connected to bus 290, for providing an interface for connection between a mouse 252 and a keyboard 254; a display interface (hereinafter referred to as a "display I/F") 260, connected to bus 290, for providing an interface related to connection with a display 262; and a network interface (hereinafter referred to as a "network I/F") 270 providing wired or wireless (in the present embodiment, wired) connection to network line 400 and to the Internet 500. FSS server computer 200 may include a magnetic disk drive on which a magnetic disk is mountable, and capable of writing of information to the magnetic disk and reading of information from the magnetic disk, in place of or in addition to optical disk drive 280.

Bus 290, ROM 220, RAM 230, hard disk 240, optical disk drive 280, input I/F 250, display I/F 260 and network I/F 270 all operate in cooperation with each other under the control of CPU 210, and as the server computer in accordance with the present invention, FSS server computer 200 realizes processes of various applications. By way of example, such applications realize a server computer in the network image forming system, for appropriately presenting an optional function or functions related to a function often used in MFP 300.

The computer program or programs causing FSS server computer 200 to operate as the server computer of the network image forming system in accordance with the present embodiment are stored in optical disk 282 to be inserted to optical disk drive 280, and transferred to hard disk 240. Alternatively, the programs may be transmitted through network line 400 to FSS server computer 200 and stored in hard disk 240. At the time of execution, the programs are loaded to RAM 230. The programs may be directly loaded to RAM 230 from optical disk 282 or through network line 400.

These programs include a plurality of instructions causing FSS server computer 200 to operate as the server computer in the network image forming system in accordance with the present embodiment. Some of the basic functions necessary to realize these operations are provided by an operating system (OS) operating on FSS server computer 200 or a third-party program, or a program module of various software tool kits installed in FSS server computer 200. Therefore, the program may not necessarily include all functions required to realize the image forming system in accordance with the present embodiment. The program may include only the instructions executing a prescribed process as FSS server computer 200 described above, by calling appropriate functions or "tools" in a controlled manner to attain the desired results. General operations of a computer as the substance of FSS server computer 200 are well known and, therefore, description will not be given here.

<MFP 300>

—Overall Configuration—

Figure 3:
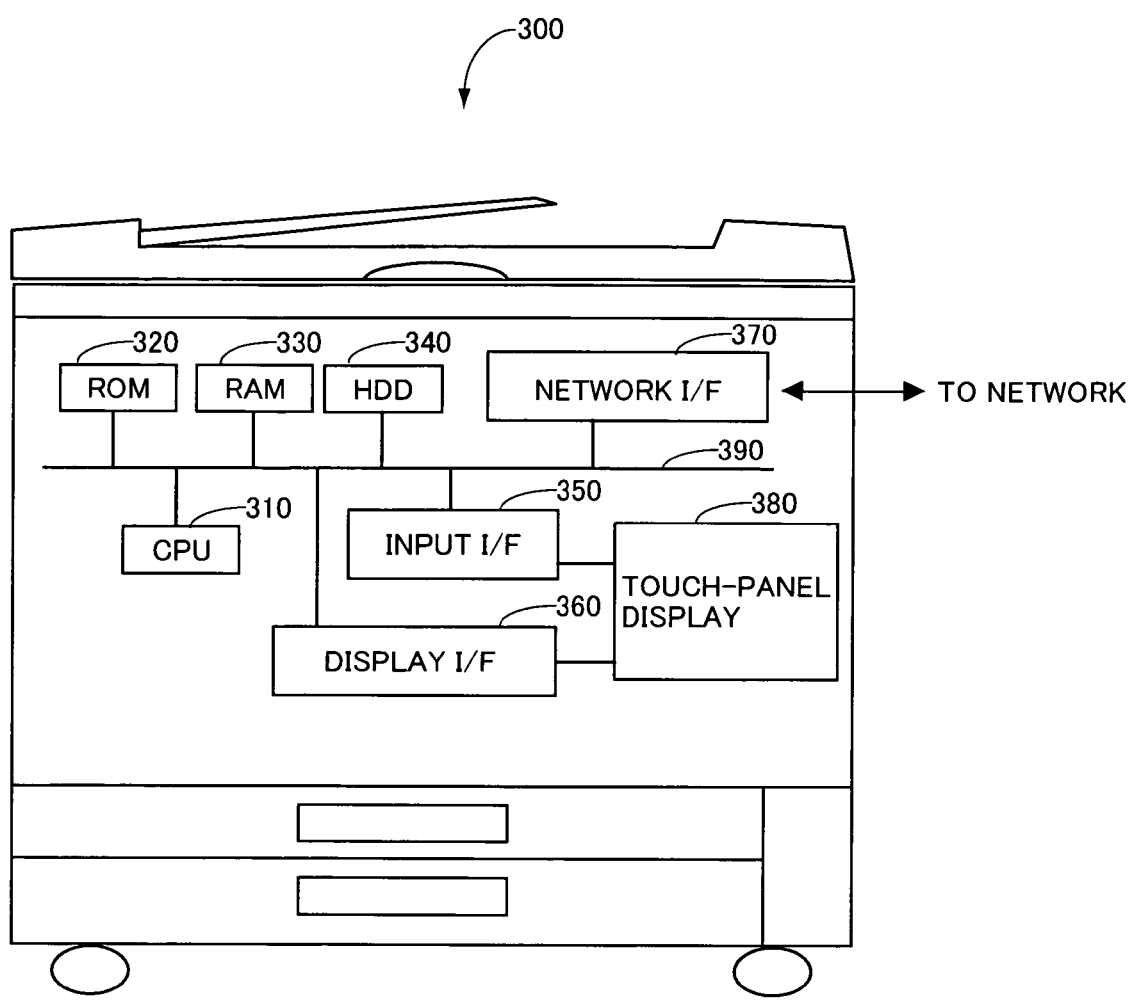
FIG. 3 is a control block diagram showing hardware configuration of the MFP shown in FIG. 1.

Referring to FIG. 3, MFP 300 forming the network image forming system in accordance with the present embodiment includes: a bus 390; a CPU 310 connected to bus 390; an ROM 320 connected to bus 390; an RAM 330 connected to bus 390; a hard disk (HDD) 340 connected to bus 390; an input I/F 350 and a display I/F 360, connected to bus 390, for providing interface related to connection with touch-panel display 380; and a network I/F 370, connected to bus 390, for providing wired or wireless (in the present embodiment, wired) connection to network line 400 and to the Internet 500. Though not shown in FIG. 3, MFP 300 includes hardware buttons such as a start button and ten-key buttons.

MFP 300 has a function of allowing a user to log-in, to use MFP 300. By way of example, it includes an input unit receiving an input of a user number (such as a company member number) as a user ID, and a determining unit determining whether the input number is a user number registered in advance. The input unit may be a fingerprint input unit and the determining unit may be a fingerprint recognizing unit. Any biometric information other than the fingerprint may be used.

Bus 390, ROM 320, RAM 330, hard disk 340, input I/F 350, display I/F 360 and network I/F 370 all operate in cooperation with each other under the control of CPU 310, and realize the printing process, FAX transmission/reception process, scanner process and copy process in MFP 300. These processes are executed by various components forming MFP 300, not shown in FIG. 3, under the control of CPU 310.

The computer program or programs causing MFP 300 to operate as the image forming apparatus of the network image forming system in accordance with the present embodiment are stored in hard disk 340. Alternatively, the program may be transmitted from an application server computer through network line 400 and the Internet 500 and stored in hard disk 340. At the time of execution, the programs are loaded to RAM 330. The program may be directly loaded to RAM 330 through network line 400 and the Internet 500.

These programs include a plurality of instructions causing MFP 300 to operate as the image forming apparatus in the network image forming system in accordance with the present embodiment. Some of the basic functions necessary to realize these operations are provided by a firmware operating on MFP 300 or by various application programs installed in MFP 300. Therefore, the application programs may not necessarily include all functions required to realize the image forming system in accordance with the present embodiment.

Further, the application program may include only the instructions executing a prescribed process as MFP 300 described above, by calling appropriate functions or "tools" in a controlled manner to attain the desired results. Specifically, rather than downloading and installing an application program to MFP 300 (to store the application program in hard disk 340), an instruction may be transmitted to an application server computer (not shown) connected to the Internet 500, and the result of execution of the process by the application server computer may be returned to MFP 300 every time the function is executed. Such a manner of operation is similar to the so-called cloud computing, in which the user uses computer processing as a service through the Internet.

As described above, the optional function in MFP 300 in accordance with the present embodiment may be realized by an application program that is downloaded and installed, or may be realized as a service provided by an application server computer.

It is unnecessary that the FSS server computer 200 and the application server computer are connected through the Internet 500. For instance, MFP 300 may transmit the use history information to FSS server computer 200, the recommended optional function information from FSS server computer 200 may be received by MFP 300, or the necessary data from the application server computer may be received by MFP 300, through a public line and a modem.

—Image Forming Unit in MFP—

MFP 300 includes, for example, a document reading unit, an image forming unit, a paper feed unit, and a paper discharging device. In MFP 300, on image data received from another device or image data of an original document read by the document reading unit, various image processing operations are done by CPU 310, and the resulting image data is output to the image forming unit. MFP 300 includes a so-called laser type (electrophotographic type) printing function, in which a laser beam is used for exposure. It may have a different type printing function.

The image forming unit is for printing an image represented by the image data on a sheet of recording paper, and it includes, by way of example, a photoreceptor drum, a charger, a laser scanning unit, a developer, a transfer device, a cleaning device, a fixing device and a neutralizer. In the image forming unit, a feeding path, for example, is formed, and a sheet of recording paper fed from the paper feed unit is fed along the feeding path. The paper feed unit draws out sheets of recording paper stacked on a paper feed cassette or on a manual feed tray one by one, and feeds the sheet of paper to the feeding path of the image forming unit.

While the sheet of recording paper is fed along the feeding path of image forming unit, the sheet passes between the photoreceptor drum and the transfer device, and further passes through the fixing device, whereby printing is done on the sheet of recording paper.

The photoreceptor drum rotates in one direction, and its surface is cleaned by the cleaning device and the neutralizer and, thereafter, uniformly charged by the charger. The laser scanning unit modulates the laser beam based on the image data to be printed, and repeatedly scans the surface of photoreceptor drum with the laser beam in a main scanning direction, whereby an electrostatic latent image is formed on the surface of photoreceptor drum. The developer develops the electrostatic latent image by supplying toner to the surface of photoreceptor drum, and thus, a toner image is formed on the surface of photoreceptor drum.

The transfer device transfers the toner image on the surface of photoreceptor drum to the sheet of recording paper passing between the transfer device and the photoreceptor drum. The fixing device includes a heating roller for heating the sheet of recording paper and the pressure roller for pressing the sheet of recording paper. As the sheet of recording paper is heated by the heating roller and pressed by the pressure roller, the toner image that has been transferred to the sheet of recording paper is fixed on the sheet. The sheet of recording paper discharged from the fixing device (printed paper) is discharged to the discharge tray. The paper discharging device may perform a process of sorting a plurality of printed sheets of recording paper to be output to different discharge trays, a process of punching each sheet of recording paper or a process of stapling the sheets of recording paper. Assume that a number of copies of the printing are to be prepared. In that case, sheets of recording paper are sorted and discharged to paper discharge trays such that each tray contains each set of printed sheets, and the set of printed sheets in each tray is stapled or punched, whereby copies of prints are prepared. Such processes are performed under the control of CPU 310. Punching process may be done on each sheet of the recording paper.

—Basic Functions (Modes) of MFP—

Using the printing function as such, the printer mode is realized, in which print data is received through network line 400 from a personal computer connected to network line 400 and an image is formed on a sheet of recording paper.

Further, MFP 300 realizes the copy mode, in which a document is read by the document reading unit as image data, and an image is formed on a sheet of recording paper based on the image data.

Further, MFP 300 realizes the facsimile transmission mode, in which a document is read by the document reading unit as image data, and the image data is transmitted to another apparatus. MFP 300 also realizes the facsimile reception mode, in which an image is formed on a sheet of recording paper based on image data received from another apparatus. In the following, the facsimile transmission mode and the facsimile reception mode will be referred to as the facsimile mode. In MFP 300, the facsimile transmission mode is displayed as fax/image transmission mode on touch-panel display 380.

Further, MFP 300 realizes the document filing mode, in which a document is read by the document reading unit as image data, and the image data is stored in hard disk 340. The image data may be stored not in hard disk 340 of MFP 300 but in another device (computer, external storage), through network line 400. In that case, SMB (Server Message Block) as a protocol realizing file-sharing or printer-sharing through the network may be used. Using this protocol, it becomes possible to transfer scanned image data to a shared folder shared on the network. The function is sometimes referred to as "scan-to-folder" or "scan-to-shared folder."

As described above, MFP 300 has, as the basic functions (modes), the copy mode, the fax/image transmission mode, the document filing mode and the printer mode. In the printer mode, when print data is received from a personal computer connected to network line 400, MFP 300 is automatically switched to the printer mode, and the image is formed on a sheet of recording paper based on the print data. Therefore, an image for selecting the printer mode is not displayed on touch-panel display 380 of MFP 300.

[Management Table Configuration]

The image forming system in accordance with the present embodiment includes a recommended option presenting function, of displaying an optional function or functions related to a function often used by the user of MFP 300 on touch-panel display 380. In order to realize the recommended option presenting function as such, data are stored in various tables in hard disk 240 of FSS server computer 200.

Referring to FIG. 4, a machine management table stored in hard disk 240 of FSS server computer 200 will be described.

As shown in FIG. 4, the machine management table includes a field for storing machine ID for uniquely identifying MFP in the network image forming system, a field for storing the segment to which the MFP belongs, and a field for storing an already introduced optional function or functions.

Every time an optional function is introduced, MFP 300 transmits information of the introduced optional function to FSS server computer 200. Based on the received information, FSS server computer 200 updates the machine management table. If no optional function has been introduced, nothing is stored in the field of already introduced optional function. The number of already introduced optional functions is not specifically limited. Further, it may be possible to store introducible optional function or functions, or not introducible optional function or functions.

Referring to FIG. 5, a user use history management table stored in hard disk 240 of FSS server computer 200 will be described.

As shown in FIG. 5, the user use history management table stores use history indicating which functions are used by the users in MFP 300, based on the use history information transmitted from MFP 300.

As shown in FIG. 5, the user use history management table consists of: a field for storing user ID for uniquely identifying a user; a field for storing machine ID for uniquely identifying an MFP 300; a field for storing information related to date and time of use; a field for storing basic function used (copy mode, fax/image transmission mode, document filing mode and the like); and fields for storing set function (1), set function (2), set function (3) . . . used. The set functions may be stored assuming that the user set the functions time-sequentially in the order of set function (1), set function (2), set function (3) . . . , or the function or functions may be stored in accordance with a predetermined priority.

The set function (N) (N is a natural number) stored in the user use history management table includes: history of using copy function to an A3-sized sheet of recording paper; history of using copy function to an A4-sized sheet of recording paper; history of scanning a A3-sized color document; history of scanning a high-resolution document; and history of accessing image data stored in hard disk 340 of MFP 300 in the document filing mode (as well as the number of image data file stored in hard disk 340). If the number of image data files stored in hard disk 340 of MFP 300 is large and the use history of accesses to the image data in the document filing mode is stored, it can be determined that when the user accesses a desired image data for printing or transmitting the data, it would take much time and labor to access the image data. Since FSS server computer 200 can receive the number of printed sheets from MFP 300, it is possible to store the number of sheets printed in the used function.

Referring to FIG. 6, the user use history analysis table stored in hard disk 240 of FSS server computer 200 will be described.

As shown in FIG. 6, the user use history analysis table, which uses machine ID as a key, consists of: a field for storing used function (standard functions other than optional functions); a field for storing frequency of use (here, number of use per month); a field for storing an optional function or functions recommended for the used function; and a field for storing the manner of implementing the optional function or functions.

The field for storing used function stores functions in the form of basic function (mode)/used function. As shown in FIG. 6, by way of example, it is stored that in MFP 300 having the machine ID "M001", a large volume printing function was used in the copy mode and a large capacity image data was scanned by the filing function in the copy mode (for example, a bulk document mode as a special function was used), and that in MFP 300 having the machine ID "M002", a folder designating function was used to access an image data stored in hard disk 340 in the document filing mode.

The used functions shown in FIG. 6 are examples, and the present invention is not limited to such functions. For instance, the filing function may not be a function in the copy mode but in a document filing mode. In the following, though the filing function in the copy mode is the same as the filing function in the document filing mode, it will be described as a function of providing a sheet of copy of a scanned image data and storing the scanned image data in hard disk 340, which function is selectable in the copy mode.

In the field for storing a recommended optional function, a recommended optional function corresponding to the used function (standard function other than the optional functions) is stored. The recommended optional function refers to a function that allows the user to use the standard function more conveniently if it is introduced to MFP 300. As shown in FIG. 6, for example, "large capacity paper feed tray" is set for the "copy/bulk printing" function, "scanner high compression unit" is set for the "copy/filing" function, and "folder template" is set for the "document filing/folder designation" function. In the following, relation between the standard functions and recommended optional functions will be described.

From the analysis of the functions used by the user, if it is found that the copy function to A3-sized sheets of recording paper is frequently used (if the frequency of designating A3-sized paper is high in the copy mode/bulk printing), introduction of an optional unit of A3 large capacity paper feed tray is recommended to the user. By introducing the optional unit, convenience for the user copying on A3-sized recording paper can be improved. The size of recording paper is not limited to A3, and if the frequency of use of A4-sized paper is high (frequency of replenishment to A4 sized paper feed tray is high), introduction of an optional unit of A4 large capacity paper feed tray is recommended to the user. By introducing the optional unit, convenience for the user copying on a large number of A4-sized sheets of recording paper can be improved (the number of replenishing the sheets of recording paper can be reduced).

If the function of reading A3-sized color documents or high resolution documents is frequently used (if color image or the like is frequently designated in the filing function of copy mode), the image data comes to have very large data capacity, possibly leading to transmission failure because of too large transmission data size, or too much time of transmission, or shortage of storage capacity of hard disk 340. In such a case, a scanner high compression unit realizing the function of highly compressing image data is recommended to the user. This can reduce data capacity and improves convenience for the user.

Further, if the document filing mode of MFP 300 is used with high frequency, the following optional function is recommended. In the document filing mode, generally, scanned image data is saved (filed) in hard disk 340 of MFP 300 (or an external storage) and, at a later date, the user designates the image data, and reads and prints or transmits the data. In order to designate the image data, he/she selects the image data from a folder designating image displayed on a touch-panel display 380 (user interface) of MFP 300. Here, if a large number of image data are stored, it is difficult for the user to find the image data file. Therefore, if it is detected that such a function is used with high frequency, an application that can customize the display on touch-panel display 380 is recommended to the user. When the user executes the recommended application, a button having a link from the initial image of the document filing mode to the often used image data file can be displayed on touch-panel display 380. As a result, the user can easily find the desired image data file. Specifically, in MFP 300, in which a number of key operations has been required to reach a desired image data file, if the application as the optional function is recommended and the user introduces the application to the MFP 300, it becomes possible to easily reach the desired image data file simply by designating only once the link button introduced by customizing the image of touch-panel display 380 by the application.

In order to recommend such optional functions to the user, FSS server computer 200 forming the network image forming system in accordance with the present embodiment stores the table described above in hard disk 240, and executes the program described in the following by CPU 210. Further, MFP 300 forming the network image forming system also executes the program described in the following by CPU 310. Further, combinations of functions and corresponding recommended functions are stored as a management table, in hard disk 240 of FSS server computer 200.

[Software Configuration]

Figure 7:
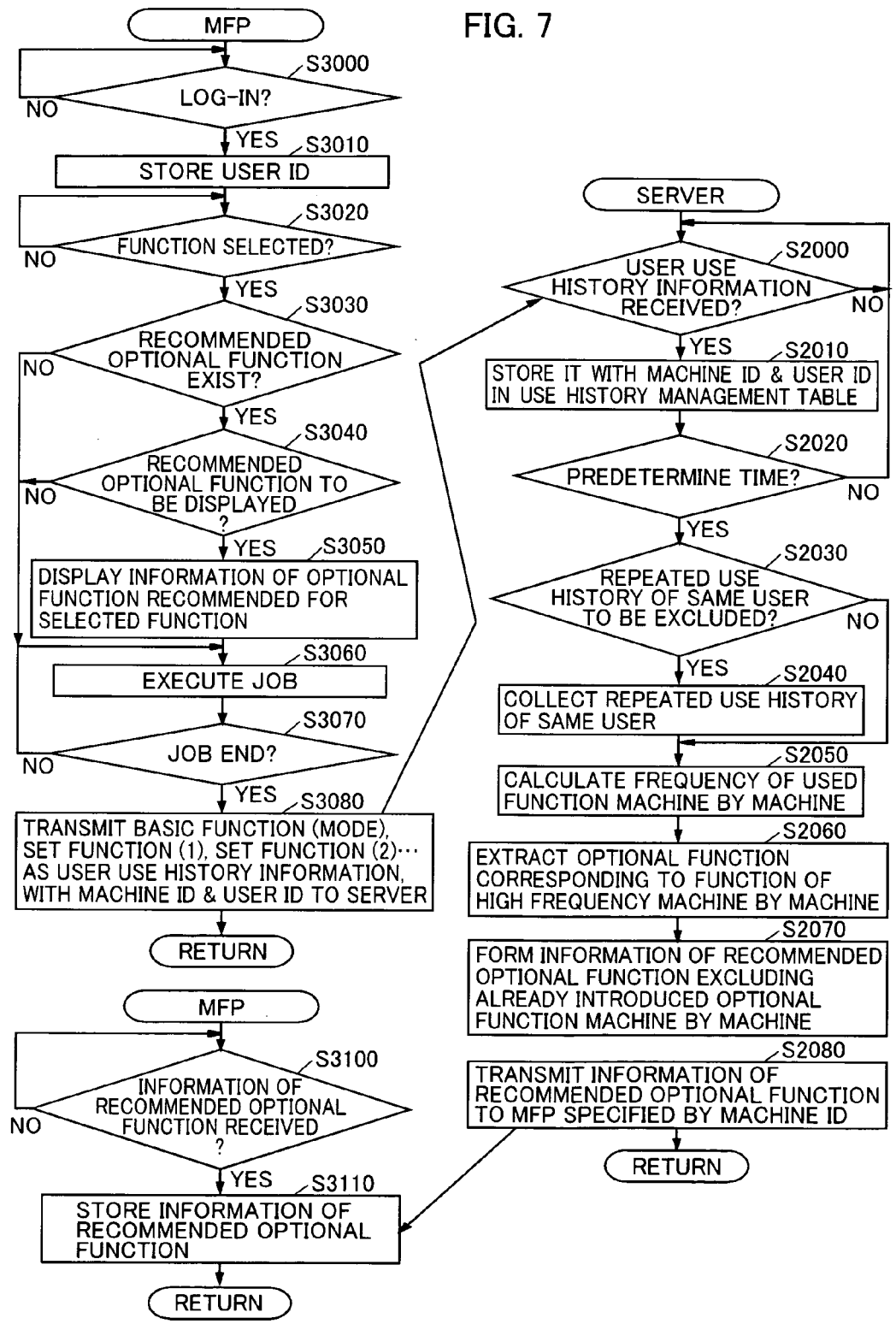
FIG. 7 is a flowchart showing a control structure of the program executed by the server computer and the MFP shown in FIG. 1.

Referring to FIG. 7, control structures of computer programs executed by FSS server computer 200 and MFP 300 in order to realize the process of recommending an optional function to allow the user to more conveniently use a function of high frequency of use, based on the user use history in the network image forming system in accordance with the present embodiment, will be described.

The program shown on the upper left portion of FIG. 7 is executed by CPU 310 of MFP 300. At step (hereinafter "step" will be denoted by "S") 3000, CPU 310 of MFP 300 (hereinafter simply referred to as CPU 310) determines whether or not a user of MFP 300 has requested log-in and successfully logged-in. At this time, CPU 310 displays a user number input image or a fingerprint input image on touch-panel display 380, and when a user number is input or a fingerprint of the user is input, it determines that the user who is going to use MFP 300 has logged-in. If the user who is to log-in is determined to be a user registered in advance based on the user number or the user fingerprint, CPU 310 permits log-in. If CPU 310 permits log-in, a determination of successful log-in is made. If it is determined that the user of MFP 300 has successfully logged-in (YES at S3000), the process proceeds to S3010. Otherwise (NO at S3000), the process returns to S3000, and waits until it is determined that a user of MFP 300 has logged-in.

At S3010, CPU 310 stores a user ID for uniquely identifying a user, registered in correspondence with the input user number or the fingerprint of the user.

At S3020, CPU 310 determines whether or not the user has selected a function provided by MFP 300. The function selected here is a standard function and not an optional function. Specifically, if a function selection button displayed on touch-panel display 380 of MFP 300 is pressed, CPU 310 determines that a standard function provided by MFP 300 is selected by the user. If it is determined that a standard function provided by MFP 300 is selected by the user (YES at S3020), the process proceeds to S3030. Otherwise (NO at S3020), the process returns to S3020, and waits until it is determined that the user of MFP 300 selected a standard function.

At S3030, CPU 310 determines whether or not there is any optional function recommended for the standard function selected by the user. Here, CPU 310 refers to the recommended optional function information (corresponding to the table of one MFP in the user use history analysis table shown in FIG. 6) stored in hard disk 340, and if an optional function is stored in association with the standard function selected by the user among the recommended optional function information, it determines that there is a optional function recommended for the standard function selected by the user. If it is determined that an optional function recommended for the standard function selected by the user exists (YES at S3030), the process proceeds to S3040. Otherwise (NO at S3030), the process proceeds to S3060.

At S3040, CPU 310 determines whether or not display of the recommended optional function on touch-panel display 380 is permitted. Here, CPU 310 determines that display of recommended optional function on touch-panel display 380 is permitted unless it is stored in hard disk 340 that "YES" is selected in response to a question of "DO YOU WANT TO STOP DISPLAY OF RECOMMENDED OPTIONAL FUNCTION?" on touch-panel display 380. If it is determined that display of recommended optional function on touch-panel display 380 is permitted (YES at S3040), the process proceeds to S3050. Otherwise (NO at S3040), the process proceeds to S3060.

At S3050, CPU 310 displays information related to the recommended optional function for the standard function selected by the user on touch-panel display 380. At S3060, CPU 310 executes the standard function selected by the user.

At S3060, CPU 310 executes a job of the standard function selected by the user. At S3070, CPU 310 determines whether or not the job is completed in MFP 300. Here, if the process for the requested standard function ends successfully, CPU 310 determines that the job of MFP 300 has been completed. If it is determined that the job of MFP 300 has been completed (YES at S3070), the process proceeds to S3080. Otherwise (NO at S3070), the process returns to S3060 and waits until it is determined that job of MFP 300 is completed.

At S3080, CPU 310 transmits the basic function (mode), set function (1), set function (2) . . . of the job that has been determined to be completed, as user use history information, together with the machine ID and the user ID, to FSS server computer 200.

The program shown on the right side of FIG. 7 is executed by CPU 210 of FSS server computer 200. At S2000, CPU 210 of FSS server computer 200 (hereinafter simply referred to as CPU 210) determines whether or not the user use history information is received from MFP 300. Here, the object is one or more MFPs 300. If it is determined that the user use history information is received from MFP 300 (YES at S2000), the process proceeds to S2010. Otherwise (NO at S2000), the process returns to S2000 and waits until it is determined that the user use history information is received from MFP 300.

At S2010, CPU 210 stores the user use history information received from MFP 300 in user use history management table shown in FIG. 5, together with the machine ID and the user ID. As the user use history information is received from a plurality of MFPs 300, a large number of pieces of user use history information come to be stored with the machine IDs and user IDs in the user use history management table. In FIG. 5, any piece of information of which date and time of use is older than a prescribed time period (for example, six months) may be erased.

At S2020, CPU 210 determines whether or not a predetermined time is reached. The predetermined time corresponds to a time interval of extracting an optional function recommended to a standard function of high frequency of use, by collecting the user use history. If it is determined that the predetermined time (for example, time corresponding to the interval of one month or three months) is reached (YES at S2020), the process proceeds to S2030. Otherwise (NO at S2020), the process is returned to S2000. The process flows in this manner since extraction of an optional function recommended for a standard function of high frequency of use may be executed with appropriate time interval, while updating of user use history management table is done on real time basis upon reception of the user use history information from a plurality of MFPs 300.

At S2030, CPU 210 determines whether or not the use history of repeated use by the same user is to be excluded, in collecting the frequency of use of a standard function, based on the user use history information stored in the user use history management table. If a standard function repeatedly used by only a specific user is reflected in collecting the frequency of use of standard functions, the status of use by the specific user could have disproportionately large influence on the result, while use histories of common users would not be correctly reflected. This process is introduced to prevent such a situation. Such a determination process may be omitted and the use history of repeated use by the same user may be reflected without exception. Further, a user management table may be stored separately, and weight corresponding to each user ID may be stored (with the weight made heavier for a heavy user or a user having higher skill), and the use history may be collected with the weight. Whether or not the use history of repeated use by the same user is to be excluded (whether the number of repeated use in a preset time period is counted as one) is set in advance by an administrator and stored in hard disk 240. If it is determined that the process should be done with the use history of repeated use by the same user excluded (YES at S2030), the process proceeds to S2040. Otherwise (NO at S2030), the process proceeds to S2050.

At S2040, CPU 210 counts the number of repeated use by the same user in a preset time period as one, to exclude the use history of repeated use by the same user.

At S2050, CPU 210 collects the frequency of used functions machine by machine (for each MFP 300). At S2060, CPU 210 extracts the optional function set corresponding to the standard function having high frequency of use, machine by machine (for each MFP 300). The results of extraction are stored in the use history analysis table shown in FIG. 6, as the standard functions having high frequencies and recommended functions corresponding to the standard functions of each MFP 300. The combinations of standard functions and recommended functions corresponding to the standard functions are separately stored as a management table in hard disk 240.

At S2070, CPU 210 forms recommended optional function information machine by machine (for each MFP 300), with already introduced optional function excluded. Here, CPU 310 excludes already introduced optional function or functions from the extracted optional functions, with reference to the machine management table shown in FIG. 4. The process of S2070 may be omitted, and at S3050 of the program executed by MFP 300, the recommended optional functions may be displayed on touch-panel display 380 with optional function or functions already introduced to the MFP excluded.

At S2080, CPU 210 transmits the formed recommended optional function information to MFP 300 identified by the machine ID.

The program shown on the lower left portion of FIG. 7 is executed by CPU 310 of MFP 300. At S3100, CPU 310 determines whether or not the recommended optional function information for each MFP 300 has been received from FSS server computer 200. If it is determined that the recommended optional function information for each MFP 300 has been received from FSS server computer 200 (YES at S3100), the process proceeds to S3110. Otherwise (NO at S3100), the process returns to S3100 and waits until the recommended optional function information for each MFP 300 is received from FSS server computer 200.

At S3110, CPU 310 stores the recommended optional function information for each MFP 300 received from FSS server computer 200 in hard disk 340. Here, it follows that CPU 310 stores the management table related to the own MFP 300 in the user use history analysis table shown in FIG. 6 in its hard disk 340. Thus, it becomes possible for each MFP 300 to store optional functions recommended (suitable) for the functions used frequently.

[Operation]

The operation of network image forming system in accordance with the present embodiment based on the structures and flowcharts as above will be described in the following.

Using the machine management table shown in FIG. 4, the user use history management table shown in FIG. 5, user use history analysis table shown in FIG. 6 and the flowchart of FIG. 7, the operation of network image forming system will be described.

First, the user requests log-in, by inputting a user number or biometric information by scan-inputting the fingerprint, on touch-panel display 380 of MFP 300 to be used (here, assume MFP 300 having machine ID of "M001"). If the user who requested log-in is a user registered in advance to allow use of MFP 300, log-in is permitted (YES at S3000). The user ID is stored in MFP 300 (S3010), and the user can be uniquely identified.

Figure 8:
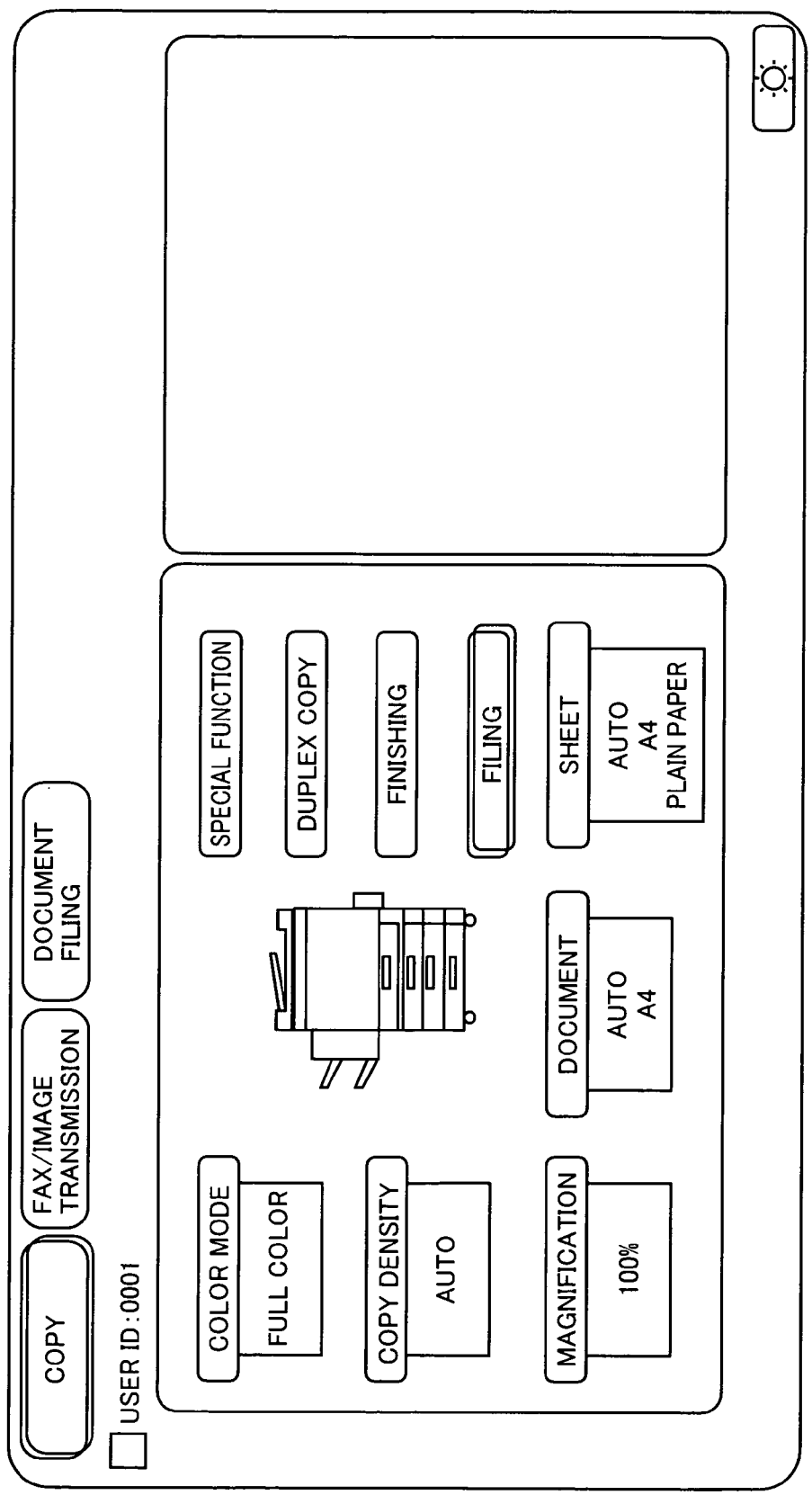
FIG. 8 is a (first) transition diagram showing an exemplary display on a touch panel display when the program of FIG. 7 is executed.

When the user logs-in, an image shown in FIG. 8 is displayed on touch-panel display 380 as the initial image of MFP 300. Assume that the user presses "copy" button first, and thereafter presses "filing" button on the image shown in the figure.

It is determined that the user has selected a desired basic function (here, copy mode) and selected a function (the filing function here is the same as the filing function in the document filing function; here, the function is to provide a copy of the scanned image on a sheet of paper and to save the scanned image data in hard disk 340) (YES at S3020) in MFP 300. Here, it is assumed that bulk documents of color images are scanned by the filing function in the copy mode.

According to the user use history analysis table shown in FIG. 6, in the MFP having machine ID of "M001", the copy/filing function is used with high frequency, and as the optional function recommended for the copy/filing function, "scanner high compression unit" is stored (YES at S3030). Assume that selection of "YES" to the displayed question "DO YOU WANT TO STOP DISPLAY OF RECOMMENDED OPTIONAL FUNCTION?" is absent in hard disk 340 (YES at S3040). Then, the information of the recommended optional function for the standard function (copy/filing function) selected by the user is displayed on touch panel display 380 (S3050).

Figure 9:
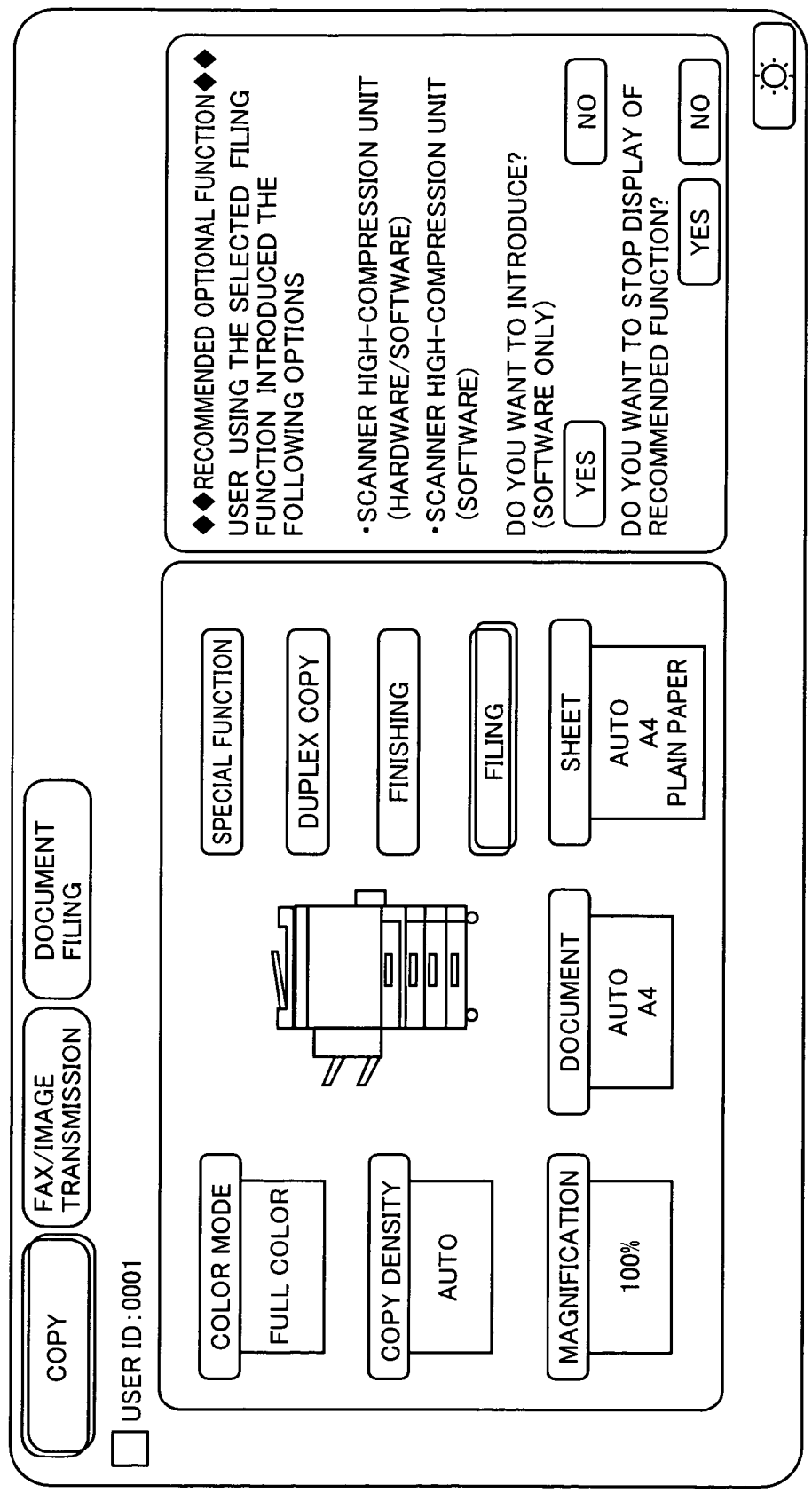
FIG. 9 is a (second) transition diagram showing an exemplary display on a touch panel display when the program of FIG. 7 is executed.

Here, an image shown in FIG. 9 is displayed on touch-panel display 380. As shown in FIG. 9, the copy/filing function selected by the user is frequently used in this MFP 300, and as shown in the user use history analysis table of FIG. 6, an optional function recommended for the copy/filing function is stored. Therefore, as shown in FIG. 9, as the recommended optional function information, a message "USER USING THE SELECTED FILING FUNCTION INTRODUCED THE FOLLOWING OPTIONS:—SCANNER HIGH-COMPRESSION UNIT (HARDWARE/SOFTWARE);—SCANNER HIGH-COMPRESSION UNIT (SOFTWARE)" is displayed. Further, a question "DO YOU WANT TO INTRODUCE? (SOFTWARE ONLY)" is displayed, together with "YES" and "NO" buttons.

If the user presses "YES" button to the question "DO YOU WANT TO INTRODUCE? (SOFTWARE ONLY)", a separate program, not shown, is executed, and when the job of S3060 (filing process in the copy mode) is executed, the read image data is highly compressed. At this time, a desired application program (high compression program) is downloaded from an application server computer and installed, or the read image data is transmitted to the application server computer and highly compressed by the application server computer and the highly compressed image data is received by MFP 300.

In this manner, if a job is executed (S3060) and the job ends (YES at S3070), the copy mode as the basic function (mode), the filing function as the set function (1), and color image and bulk document processing function as the set function (2) are transmitted as the user use history information, together with the machine ID and the user ID, to FSS server computer 200 (S3080).

Receiving the user use history information from MFP 300 (YES at S2000), FSS server computer 200 stores the received user use history information in user use history management table together with the machine ID and the user ID (S2010). Such a process is repeated, so that large number of pieces of user use history information is accumulated with machine IDs and user IDs in the user use history management table.

If it is determined that the predetermined time (for example, corresponding to the interval of one month or three months) is reached (YES at S2020), the frequency of use of each standard function is calculated machine by machine (S2050), using the use history with the use history repeatedly set in a short period of time by the same user counted collectively (S2040) if the use history of repeated use by the same user is to be excluded (YES at S2030), and using the use history stored in the user use history management table if the use history of repeated use by the same user is not to be excluded (NO at S2030).

A standard function used with high frequency is extracted (a standard function of which frequency of use is equal to or higher than a predetermined threshold value is extracted), and corresponding to the extracted standard function of high frequency of use, the set optional function is extracted (S2060). The extracted result is stored in the user use history analysis table of FIG. 6 as the standard function of high frequency of use and the recommended function corresponding to the standard function, for each MFP 300.

With reference to the already introduced option or options stored in the machine management table shown in FIG. 4, the recommended optional function information with the already introduced options excluded is formed for each MFP 300 (S2070). The formed recommended optional function information is transmitted to MFP 300 identified by the machine ID (S2080).

Receiving the recommended optional function information from FSS server computer 200 (YES at S3100), MFP 300 stores the received recommended optional function information in hard disk 340 (S3110). The recommended optional function information stored in hard disk 340 is used for the process of S3030.

As described above, in the network image forming system in accordance with the present embodiment, the FSS server computer collects and analyzes the user use histories in the MFP. For a standard function used frequently, an optional function highly related to the standard function is extracted. Introduction of the optional function extracted in this manner and not yet introduced to the MFP is recommended. Therefore, it is possible for the user to know an optional function related to the standard function often used by the user but not yet introduced to the MFP, without any specific operation of the MFP. By introducing the optional function to the MFP, the standard function frequently used by the user can be used more conveniently.

—Second Embodiment—

In the following, a second embodiment of the preset invention will be described.

The FSS server computer 200 forming the network image forming system in accordance with the present embodiment stores a partially different user use history analysis table and executes a partially different program, from those of the FSS server computer 200 in accordance with the first embodiment described above. Further, MFP 300 forming the network image forming system in accordance with the present embodiment displays, on touch-panel display 380, images partially different from those displayed by the MFP 300 in accordance with the first embodiment described above. Other configurations are the same as in the first embodiment and, therefore, detailed description thereof will not be repeated here.

Typically, FSS server computer 200 stores user use history information and provides various services using the accumulated information. It is noted, however, that not all users are willing to transmit his/her use history. Even in such a situation, minimum necessary information such as the number of printed sheets, toner alert and maintenance alert is transmitted from MFP 300 to FSS server computer 200. Here, the user use history information is not transmitted to FSS server computer 200. FSS server computer 200 in accordance with the present embodiment infers use history of an MFP 300 that does not transmit the user use history information, based on the pieces of user use history information received from an MFP or MFPs 300 of the same segment, and transmits an optional function corresponding to a standard function frequently used in the MFPs 300 of the same segment to the MFP 300 that does not transmit the user use history information. By such an approach, even to an MFP 300 set not to transmit the user use history, the optional function based on the user use history using the MFP 300 of the same segment can be proposed.

Specifically, in the present embodiment, a plurality of MFPs 300 forming the network image forming system are managed by the segment. Based on the use history of an MFP transmitting the user use history information, an optional function corresponding to a standard function used with high frequency is transmitted to an MFP 300 not transmitting the user use history information, and on touch-panel display 380 of this MFP 300, the recommended optional function of an MFP 300 of the same segment is displayed. The network image forming system operating in this manner will be described in the following.

[Management Table Configuration]

Referring to FIG. 10, the user use history analysis table stored in hard disk 240 of FSS server computer 200 will be described. The user use history analysis table shown in FIG. 10 corresponds to the user use history analysis table of FIG. 6.

As shown in FIG. 10, the user use history analysis table includes, in addition to the fields forming the user use history analysis table shown in FIG. 6, a field for storing the segment of MFP 300. In the example shown in FIG. 10, the table stores that MFP 300 having the machine ID of "M001", MFP 300 of machine ID "M005" and MFP 300 of machine ID "M011" belong to segment A, while MFP 300 of machine ID "M002", MFP 300 of machine ID "M003" and MFP 300 of machine ID "M004" belong to segment B.

Assume, for example, that MFP 300 of machine ID "M011" shown in FIG. 10 does not transmit the user use history information to FSS server computer 200.

As shown in FIG. 4, the segment may be stored in the machine management table. The machine management table and the user use history management table in accordance with the present embodiment are the same as the machine management table (FIG. 4) and the user use history management table (FIG. 5) of the first embodiment.

[Software Configuration]

Figure 11:
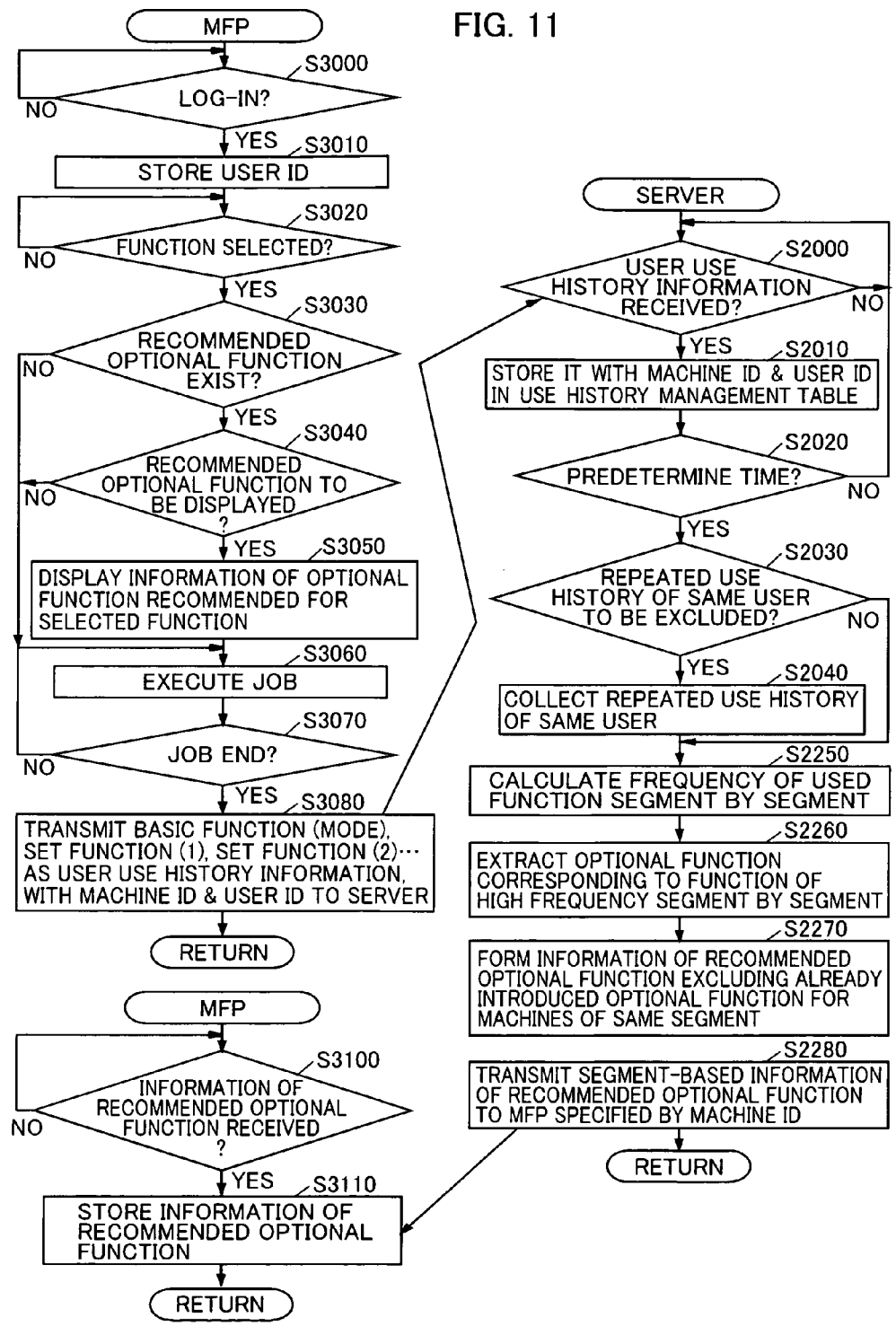
FIG. 11 is a flowchart showing a control structure of the program executed by the server computer and the MFP in accordance with the second embodiment of the present invention.

FIG. 11 is a flowchart representing a control structure of a computer program executed by FSS server computer 200 and MFP 300 in accordance with the present embodiment. The flowchart corresponds to the flowchart of FIG. 7 described above. The flowchart of FIG. 11 differs from that of FIG. 7 in that the process of steps S2050 to S2080 of FIG. 7 is changed to the process of steps S2250 to S2280 in FIG. 11.

Referring to FIG. 11, at S2250, CPU 210 collects frequency of used functions segment by segment of MFPs 300. At S2260, CPU 210 extracts an optional function set corresponding to a standard function having high frequency of use, segment by segment. As the extracted result, standard functions of high frequency of use and the recommended functions corresponding to the standard functions are stored in the user use history analysis table shown in FIG. 10, MFP 300 by MFP 300 of each segment.

At S2270, CPU 210 forms, for an MFP 300 of the same segment that does not transmit its user use history information to FSS server computer 200, recommended optional function information with already introduced optional function or functions excluded. At this time, CPU 310 deletes an already introduced optional function by looking up the machine management table shown in FIG. 4, among the extracted optional functions. If the MFP 300 that does not transmit the user use history information to FSS server computer 200 does not transmit the information of already introduced optional function information either, the process of S2270 is not executed for the MFP 300 that does not transmit the information of already introduced optional function information.

At S2280, CPU 210 transmits the segment-by-segment recommended optional function information to MFPs 300 specified by the machine IDs. At this time, the recommended optional function information is also transmitted to MFP 300 that does not transmit its user use history information to FSS sever computer 200. By way of example, the recommended optional function information of segment A is transmitted to MFP 300 having the machine ID "M011".

[Operation]

The operation of network image forming system in accordance with the present embodiment based on the structures and flowcharts as above will be described in the following. The same operation as in the first embodiment above will not be repeated here.

First, the user requests log-in by inputting a user number or inputting biometric information by fingerprint scanning on touch-panel display 380 of an MFP 300 (here, by way of example, MFP 300 of machine ID "M011"). If the user who is to log-in is determined to be a user registered in advance to allow use of MFP 300, log-in is permitted (YES at S3000). The user ID is stored in MFP 300 (S3010) and the user can uniquely be identified. The MFP 300 having machine ID "M011" logged-in in this manner belongs to segment A, and it does not transmit its user use history information to FSS server computer 200.

If the user logs-in, as the initial image of MFP 300, an image shown in FIG. 8 is displayed on touch-panel display 380. In the image shown in the figure, assume that the user presses the "copy" button and then "filing" button.

It is determined that the user selected a desired basic function (here, copy mode) and selected a function (here, filing function (in which a copy is formed and the scanned image is stored in hard disk 340)) in MFP 300 (YES at S3020). Here, it is assumed that bulk documents of color images are scanned by the filing function in the copy mode.

In segment A to which the MFP of machine ID "M001" belongs in the user use history management table shown in FIG. 10, the copy/filing function has high frequency of use, and as an optional function recommended for the copy/filing function, "scanner high compression unit" is stored (YES at S3030). Information of the recommended optional function related to the standard function (copy/filing function) selected by the user is displayed on touch-panel display 380 (S3050).

Here, an image shown in FIG. 12 is displayed on touch-panel display 380. As shown in FIG. 12, in the same segment as this MFP 300, the copy/filing function selected by the user has high frequency of use, and as shown in the user use history analysis table shown in FIG. 10, an optional function recommended for the copy/filing function is stored. Therefore, as shown in FIG. 12, as the recommended optional function information, the message "USER USING THE SELECTED FILING FUNCTION OF THE SAME SEGMENT AS THIS MFP INTRODUCED THE FOLLOWING OPTIONS:— SCANNER HIGH-COMPRESSION UNIT (HARDWARE/ SOFTWARE);—SCANNER HIGH-COMPRESSION UNIT (SOFTWARE)" is displayed.

Even after the job is executed in MFP 300 of machine ID "M011" (S3060) and the job ends, the user use history information is not transmitted to FSS server computer 200.

In MFPs 300 belonging to segment A having machine IDs "M001" and "M005" that transmit their user use history information to FSS server computer 200, when the job is executed (S3060) and the job ends (YES at S3070), copy mode as the basic function (mode), filing as set function (1), and color image and bulk document processing function as set function (2) are transmitted as user use history information, together with the machine IDs and user IDs to FSS server computer 200 (S3080).

Receiving the user use history information from MFP 300 (YES at S2000), FSS server computer 200 stores the received user use history information in the user use history management table together with the machine IDs and the user IDs (S2010). Such a process is repeated, so that large number of pieces of user use history information is accumulated with machine IDs and user IDs in the user use history management table.

Using the use history stored in the user use history management table, the frequency of use of each standard function is calculated segment by segment (S2250).

A standard function or functions having high frequency of use (standard function of which frequency of use is not lower than a predetermined threshold value) are extracted, and set optional functions are extracted segment by segment, in correspondence with the extracted standard functions having high frequency of use (S2260). The extracted results are stored for each MFP 300 as the standard functions of high frequency of use and recommended functions corresponding to the standard functions, in the user use history analysis table shown in FIG. 10.

Referring to the already introduced options stored in the machine management table shown in FIG. 4, for the MFP 300 of the same segment that does not transmit its user use history information to FSS sever computer 200, recommended optional function information is formed, with already introduced optional function or functions excluded (S2270). The formed segment-by-segment recommended optional function information is transmitted to the MFPs 300 specified by machine IDs (including the MFP 300 that does not transmit the user use history information to FSS server computer 200) (S2280).

Receiving the recommended optional function information from FSS server computer 200 (YES at S3100), MFP 300 stores the received recommended optional function information in hard disk 340 (S3110). The recommended optional function information stored in hard disk 340 is used for the process of S3030. In this manner, even in MFP 300 that does not transmit its user use history information to FSS sever computer 200, it becomes possible to display the image on which optional functions corresponding to the standard functions frequently used in MFPs of the same segment are recommended, on touch-panel display 380 (FIG. 12).

As described above, in the network image forming system in accordance with the present embodiment, even to an MFP that does not transmit its user use history information to the FSS sever computer, information related to optional functions set for standard functions frequently used in the MFPs belonging to the same segment is transmitted and displayed on the MFP. Therefore, even if the user use history information is not transmitted to the FSS server computer, if a standard function frequently used in the same segment is selected, an optional function corresponding to the function is displayed.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An information processing apparatus processing information of an optional function related to a function used in an image forming apparatus, comprising:
- a receiving device receiving use history information related to a function of the image forming apparatus used by a user;
- a storage storing said received use history information;
- a collecting device collecting functions having high frequency of use based on said stored use history information;
- an extracting device extracting, from optional functions prepared for said image forming apparatus, an optional function related to a function having high frequency of use; and
- a transmitting device transmitting information related to said function of high frequency of use and related to said extracted optional function, to be presented to the user on said image forming apparatus, to said image forming apparatus, wherein
- said collecting device includes a collecting unit collecting functions having high frequency of use by category distinguished based on output rate of image forming apparatuses;
- said extracting device includes an extracting unit for extracting, by the category, an optional function related to a function having high frequency of use; and
- said transmitting device includes a transmitting unit for transmitting information related to the function having high frequency of use and related to said extracted optional function, to an image forming apparatus belonging to the same category.

2. The information processing apparatus according to claim 1, further comprising
- an optional function storage storing an optional function introduced to said image forming apparatus; wherein
- said transmitting device includes a transmitting unit for transmitting information related to said extracted optional function not introduced in said image forming apparatus.

3. The information processing apparatus according to claim 1,
- implemented by a management server performing remote-maintenance of said image forming apparatus.

4. An image forming system, comprising an information processing apparatus; a transmitting apparatus transmitting, if transmission is permitted, use history information to the information processing apparatus; an image forming apparatus; and a receiving apparatus receiving information of an optional function related to a function used in said image forming apparatus from said information processing apparatus; wherein:
- said information processing apparatus processes information of an optional function related to a function used in an image forming apparatus, and comprises:
    - a receiving device receiving use history information related to a function of the image forming apparatus used by a user;
    - a storage device storing said received use history information;
    - a collecting device collecting functions having high frequency of use based on said stored use history information;
    - an extracting device extracting, from optional functions prepared for said image forming apparatus, an optional function related to a function having high frequency of use; and
    - a transmitting device transmitting information related to said function of high frequency of use and related to said extracted optional function, to be presented to the user on said image forming apparatus, to said image forming apparatus,
    - said collecting device includes a collecting unit collecting functions having high frequency of use by category distinguished based on output rate of image forming apparatuses;
    - said extracting device includes an extracting unit for extracting, by the category, an optional function related to a function having high frequency of use; and
    - said transmitting device includes a transmitting unit for transmitting information related to the function having high frequency of use and related to said extracted optional function, to an image forming apparatus belonging to the same category.

5. The image forming apparatus according to claim 4, further comprising:
- a selecting device allowing a user to select a function to be used; and
- a display device for presenting, when a function having high frequency of use is selected by the user, information of an optional function related to said selected function to the user.

6. The image forming apparatus according to claim 5, further comprising:
- an input device used by the user to input whether information of the optional function is to be displayed or not; wherein
- said display device includes a presenting unit presenting, if it is input by the user to display the information of the optional function, the information of said optional function to the user.

7. The image forming apparatus according to claim 4, further comprising:
- a communication apparatus communicating with a processing apparatus realizing said optional function by software; and
- a result receiving device, when execution of an optional function is requested by the user, transmitting data to said processing device, and receiving result of operation executed by the software in said processing device, from said processing device.

8. The image forming apparatus according to claim 4, further comprising:
- a communication device communicating with an application providing apparatus providing software; and
- a software receiving apparatus, when execution of an optional function is requested by the user, receiving software for realizing said optional function from said application providing apparatus.

* * * * *